April 18, 1944.　　H. O. WILLIAMS ET AL　　2,346,885
DEEP WELL SCREEN
Original Filed April 15, 1940　　2 Sheets-Sheet 2

Inventor
HOWARD O. WILLIAMS
ALBERT A. JENS
By M. A. Whiteley
Attorney

Patented Apr. 18, 1944

2,346,885

UNITED STATES PATENT OFFICE 2,346,885

DEEP WELL SCREEN

Howard O. Williams, Minneapolis, and Albert A. Jens, St. Paul, Minn., assignors to Edward E. Johnson, Incorporated, St. Paul, Minn.

Application April 15, 1940, Serial No. 329,749, which is a division of application Serial No. 222,410, August 1, 1938. Divided and this application September 18, 1942, Serial No. 459,061

1 Claim. (Cl. 166—5)

Our invention relates to a deep well screen and has for its object to provide a deep well screen of very strong construction wherein the strainer surface is held upon and substantially spaced from the outside surface of an unbroken integral perforated pipe base, said strainer surface comprising longitudinal members spaced apart to form drainage slots of suitable width between each pair thereof and welded to and integrated with a supporting member rigidly held upon the pipe base.

Under certain conditions of use, a deep well screen is subjected to such heavy strains that, to successfully resist such strains in being set, the strainer surface proper has to have additional support. A perforated pipe base furnishes said support, but limitations of construction in the matter of the holes or perforations through the pipe base make necessary widely spaced holes and small flow capacity through the holes. Hence if the strainer surface is laid directly upon the pipe base it will be operative only directly over the holes in the pipe base and will give insufficient area to provide, under most working conditions, a sufficient volume of flow of liquid to the interior of the pipe base. We have discovered it is practicable to form a supporting and spacing member of wire roughly triangular in cross-section which is laid helically upon the pipe base made substantially integral therewith by being heated as laid and so be shrunk upon the pipe base. In doing this the triangular wire has its flat base adjacent the pipe base which results, after shrinking, in a very firm grip and substantial union between the pipe base and the helically wound wire. This wire will be laid in helical coils, the several pairs of coils being spaced apart distances several times the diameter of the holes. Strainer elements will be applied longitudinally to the helical coils of the supporting and spacing member, and this will result in the formation of helically disposed channels between the strainer surface and the pipe base which permits a maximum strainer surface to be available for the inflow of liquid.

It is a principal object of our invention, therefore, to provide a deep well screen having an inner integral unitary pipe base formed with somewhat widely spaced holes of substantial diameter having thereon a supporting and spacing member rigidly held upon the pipe base to which are secured by welding at every crossing point thereof a multiplicity of longitudinal members spaced apart at their edges to form suitable drainage slots and thus providing wide free channels inside the strainer surface leading to the holes through the pipe base.

It is a further object of our invention to form the helically laid supporting and spacing member of roughly triangular cross-section and to have the same secured upon the pipe base with its broad flat top in engagement therewith.

It is a further object of our invention to form the longitudinal strainer elements of roughly triangular cross-sectional shape and to cause the narrowed inturned portions thereof to be welded to the narrowed outturned portions of the helically coiled supporting and spacing members at every crossing point thereof so as to bring the outer surfaces of the strainer elements in a common cylindrical plane and to form drainage slots which expand inwardly from that cylindrical surface to their opening into the channels formed between pairs of helical coils of the supporting and spacing members.

This application is directly a division of application Serial No. 329,749, filed April 15, 1940, which has matured into Patent No. 2,312,458, dated March 2, 1943, and said application Serial No. 329,749 is a division of application Serial No. 222,410 filed August 1, 1938.

The full objects and advantages of our invention will appear in connection with the detailed description of it which is given in the appended specification, and the novel combination of elements for producing the above-defined valuable and highly advantageous results will be particularly pointed out in the claims.

In the drawings illustrating an application of our invention in one of its forms:

As illustrated, the primary or base member of a well screen is the pipe base 10. This is a heavy integral tubing formed in a customary manner and is capable of supporting and resisting very heavy strains both compressive and torsional encountered in setting the well screen into position in very deep wells such as are found in the oil industry. The pipe base 10 is provided with a multiplicity of apertures or holes 11 preferably round or circular, which extend in longitudinal and circumferential rows preferably staggered in position in succeeding rows. These holes are of considerable diameter but are necessarily spaced apart distances such that unperforated metal between any pair of holes will in usual practice be more than double the diameter of the holes.

Figure 3:
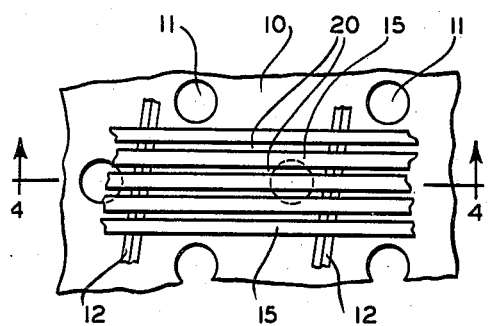
Fig. 3 is a fragmentary plan view in horizontal position, showing the relation of the supporting and spacing members to the screen forming elements.
Figure 4:
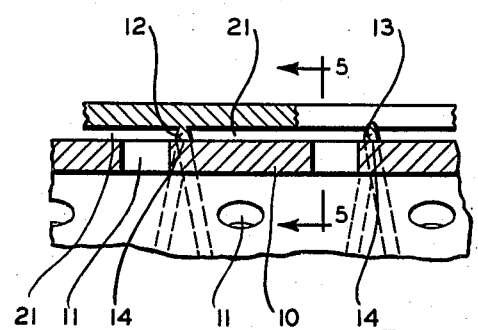
Fig. 4 is a sectional view through a wall of the screen taken on line 4—4 of Fig. 3.

In the production of our well screen a supporting and spacing member 12 is positioned in helical coils upon the pipe base 10. This member as shown at 13 of Fig. 4, is roughly triangular in cross-section and has its base 14 contacting the outer surface of the pipe base 10. In practice it is laid helically upon the base pipe being very considerably heated in advance of laying so that subsequent cooling of the coils after being laid will shrink the same upon the outer surface of the pipe base so as to make the helical coils of supporting member 12 substantially integral with the pipe base, and as clearly shown, particularly in Figs. 1, 3 and 4, the successive coils of the supporting and spacing member 12 are spaced apart distances several times the diameter of the holes 11.

Figure 2:
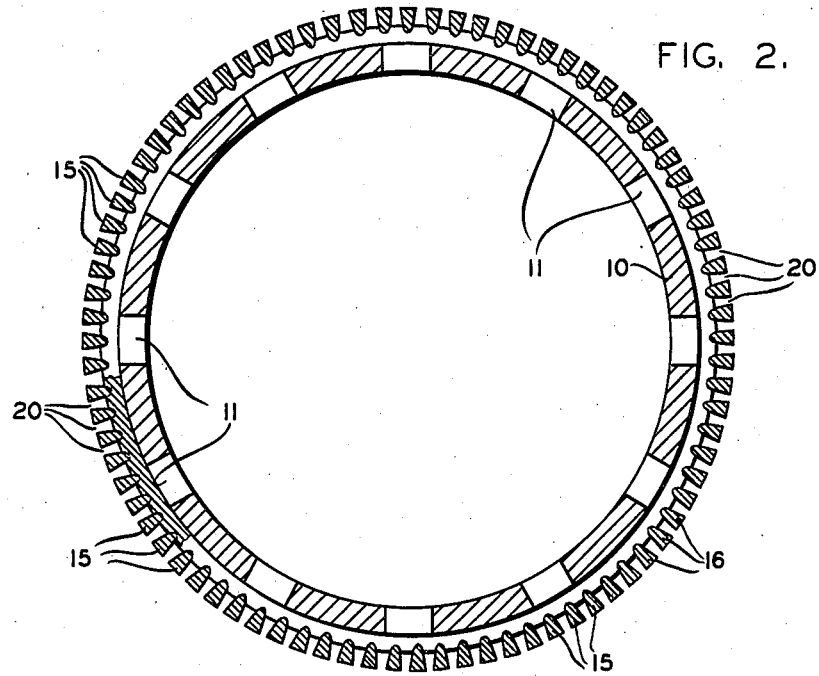
Fig. 2 is a transverse sectional view of the well screen taken on line 2—2 of Fig. 1.
Figure 5:
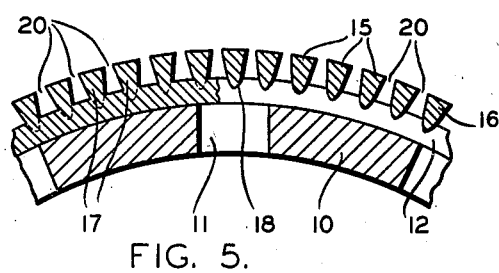
Fig. 5 is a fragmentary sectional view taken on line 5—5 of Fig. 4.

In the production of the screen a multiplicity of longitudinal strainer elements 15 are laid upon and secured to the coils of the supporting and spacing member 12. As clearly indicated at 16 of Figs. 2 and 5, these longitudinal elements are roughly triangular in cross-section. They have their narrowed edges laid and welded to the helical coils of supporting and spacing member 12 at every crossing point thereof. As shown at 17 and 18 of Fig. 5, the two narrowed edges of the supporting and spacing member 12 and the longitudinal screen forming elements 15 are welded together and sunk one within the other so as to have the outer flat surfaces 19 of the strainer elements fall in a common cylindrical plane as clearly shown in Fig. 2. There are thus formed between adjacent pairs of strainer elements 15, inwardly expanding slots 20. The narrowest portion of said slots will be at the tops of the longitudinal elements and they will expand inwardly from that point to their extreme inner ends. The width of the slots shown in the drawings is, of course, merely for purposes of illustration, and these slots at their narrowest point may be made narrower or wider as the conditions of use may require.

Figure 1:
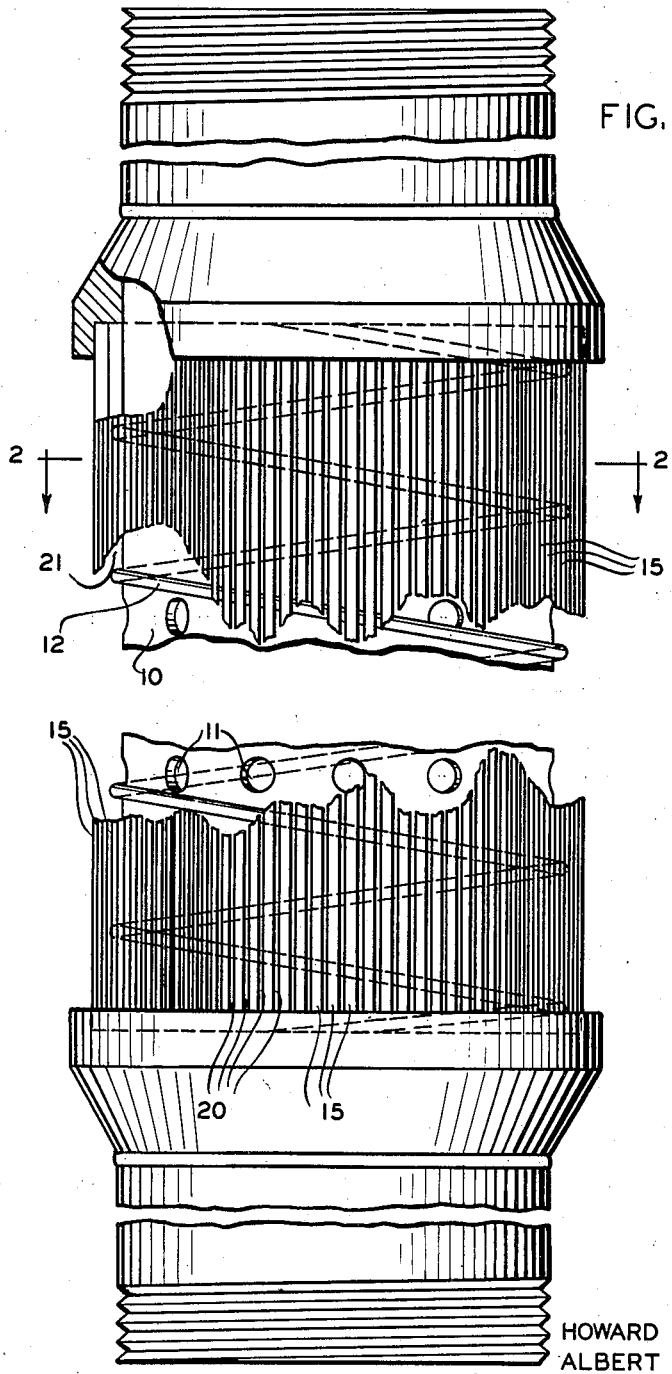
Fig. 1 is a full plan view in vertical position of a well screen embodying our invention, with some parts broken away and in section.

Referring particularly to Figs. 1 and 4, it will be noted that free channels 21 of a breadth several times the diameter of the holes 11 will be formed between the outside surface of the pipe base 10 and the inner margins of the screen surface formed by the screen forming elements 15.

Each of the channels 21 extending from end to end of the well screen opens to the inside of the pipe base 10 through a large number of the holes or openings 11. Thus the liquid which flows through the slots 20 has an extensive area along channels 21 to reach the several holes 11 and substantially the full area of screen surface is available to permit inflow of liquid.

The advantages of our invention are evident from and inherent in the description heretofore given. One of the very great advantages is, of course, that an extremely strong well screen is provided adapted to resist the severe stresses and strains which result from setting the well screen to great depths as in oil wells.

A further advantage of our screen is that the outer surface is made up entirely of longitudinal elements very rigidly held by welding union to the spacing and supporting helical coils of member 12 and offering no obstruction in setting, indeed, being particularly easy for moving down into setting position since there are no transverse projections or slots.

A further advantage resides in the fact that the screening slots at the outer edges may be made extremely narrow and yet that the very large area of screening surface available for drainage through the helical channels to the holes in the pipe base will permit a full flow through said holes regardless of the fact that the drainage slots may be extremely narrow. This is of very high importance in connection with bodies of oil located in very fine silt or sand as sometimes happens.

We claim:

A deep well screen comprising an internal integral pipe member formed with a multiplicity of spaced holes extending through the walls thereof, a supporting member of roughly triangular cross-sectional shape having its flat top face rigidly held on said pipe base in a helix so as to be substantially integral therewith, the coils of the helix being spaced apart greater distances than the diameters of the holes, and a multiplicity of longitudinal strainer elements each of roughly triangular shape having the narrowed portions thereof welded to the coils of the supporting member at every crossing point and being spaced apart at adjacent edges of the flat top walls to form inwardly expanding drainage slots of suitable outside width, whereby channels are formed between the inner limits of the strainer elements and the outer surface of the pipe base for leading to the holes in the pipe base liquid which passes through the inwardly expanding slots of the screening surface.

HOWARD O. WILLIAMS.
ALBERT A. JENS.